(12) United States Patent
Xing et al.

(10) Patent No.: US 7,506,115 B2
(45) Date of Patent: Mar. 17, 2009

(54) INCREMENTAL PROVISIONING OF SOFTWARE

(75) Inventors: Bin Xing, Shanghai (CN); Lechong Chen, Shanghai (CN); Ke Yu, Shanghai (CN); Jianfeng Mei, Shanghai (CN); Yi Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 10/587,343

(22) PCT Filed: Oct. 28, 2004

(86) PCT No.: PCT/CN2004/001221

§ 371 (c)(1),
(2), (4) Date: Jul. 25, 2006

(87) PCT Pub. No.: WO2006/045217

PCT Pub. Date: May 4, 2006

(65) Prior Publication Data

US 2007/0162690 A1    Jul. 12, 2007

(51) Int. Cl.
G06F 12/02    (2006.01)
(52) U.S. Cl. .................................... 711/162
(58) Field of Classification Search .......... 711/162; 717/177
See application file for complete search history.

(56) References Cited

U.S. PATENT DOCUMENTS 6,141,773 A    10/2000 St. Pierre et al.
7,272,549 B2 *    9/2007 Kortum et al. ............. 703/21
2002/0120791 A1    8/2002 Somalwar
2003/0120685 A1 *    6/2003 Duncombe et al. ......... 707/200
2003/0233647 A1 *    12/2003 Blaser et al. .............. 717/174

FOREIGN PATENT DOCUMENTS

WO    200140944 A2    6/2001
WO    200140944 A3    11/2002

OTHER PUBLICATIONS

Hardsoft HD Recovery Card, web page 1 (file saved Aug. 12, 2004) http://www.hasu.com.cn/english/eproduct/ecp.htm <<HD protection1.mht>>.
Hardsoft HD Recovery Card, web page 2 (file saved Aug. 12, 2004) http://www.hasu.com.cn/english/eproduct/ehy.htm <<HD protection2.mht>>.
English Translation of Korean Office Action for Patent Application No. 10-2007-7007395 mailed Aug. 25, 2008.

* cited by examiner

*Primary Examiner*—Kevin L Ellis
(74) *Attorney, Agent, or Firm*—D'Ann Naylor Rifai

(57) ABSTRACT

Methods and apparatuses provide for incremental provisioning of software for a processing system. For instance, a processing system may include a machine accessible medium and a processor in communication with the machine accessible medium. In addition, instructions encoded in the machine accessible medium may cause the processing system to automatically determine whether a storage device in the processing system includes modified blocks, based at least in part on a write log file that identifies blocks that were modified during a user session on the processing system. In response to identifying at least one modified block in the storage device, the processing system may automatically replace data in the modified block with backup data from a different storage device. Other embodiments are described and claimed.

29 Claims, 3 Drawing Sheets

INCREMENTAL PROVISIONING OF SOFTWARE

CROSS-REFERENCE TO RELATED APPLICATION

This application is a National Phase application of, and claims priority to, International Application No. PCT/CN2004/001221, filed 28 Oct. 2004, entitled INCREMENTAL PROVISIONING OF SOFTWARE

FIELD OF THE INVENTION

The present disclosure relates generally to the field of data processing, and more particularly to the incremental provisioning of software for a processing system.

BACKGROUND

Manually setting up a data processing system is time consuming work. For instance, it may take hours to install and configure the operating system (OS), drivers, and user applications desired for a particular personal computer (PC).

In certain situations, automation may be used to expedite the process. For instance, if many processing systems with identical hardware are to receive identical software components and configurations, one system to serve as a model may be manually loaded with the desired software and configured. A disk image from the model system may then be copied to each of the other systems, to provision those systems with the same software and configuration as the model system. The processing systems to be provisioned may be referred to as managed systems or managed platforms. The model image may be stored on a processing system operating as a server. Each managed system may also include firmware that runs in a preboot execution environment (PXE), retrieves the model image from the server, and loads the model image into a local hard disk drive. The managed system may then launch an OS from the local hard disk drive.

However, such a model disk image may easily exceed ten gigabytes (GB). Consequently, even though it may be unnecessary to manually install and configure individual software components, a significant amount of time is nevertheless required to provision a system from a model disk image.

Once the model image has been loaded, that image may be modified by subsequent use of the managed system. For instance, a user may intentionally or inadvertently modify the configuration settings, install new software, cause the system to receive a virus, or otherwise alter the original image. Such modifications may adversely effect how the processing system functions for subsequent users, or otherwise cause undesirable results.

Two types of adapter cards, known as hard drive (HD) protection cards or HD recovery cards, have been designed to protect the data on a hard disk drive from modification. The first type of HD protection card divides a hard disk drive into a visible partition and a hidden partition. The HD protection card then intercepts every IDE write command directed to the visible partition, and redirects those writes to the hidden partition. Subsequent reads involving the data written to the hidden partition are then also redirected to the hidden partition. Alternatively, the HD protection card can allow the write commands to modify the data in the visible partition, but only after copying the original data from the visible partition to the hidden partition.

After an HD recovery card has processed write transactions as indicated above, the user may decide whether or not to accept the modifications permanently. Alternatively, the HD recovery card may accept policy settings that cause the processing system to revert to the original data whenever the system is rebooted. For example, if writes were redirected to the hidden partition, the HD recovery card may discard or disregard the data in the hidden partition after the reboot. If writes were applied to the original partition after copying the original data to the hidden partition, the HD recovery card may copy the original data from the hidden partition back to the visible partition.

A Chinese company known as Nanjing HardSoft advertises the second type of HD protection card. Like the first type of card, the second type also uses space on the hard drive to store both the original data and the modified data. However, the second type of card may not require the use of a hidden partition on that disk drive. Instead, the second type of card may simply utilize unused blocks in the visible partition.

Both types of cards may track the changes in a modification log. The modification log may be stored in the hard drive itself, or possibly in flash memory or some other type of storage onboard the HD protection card.

Both types of HD protection cards may reduce the runtime performance of the processing system by approximately 20%. For instance, system performance is reduced significantly when original data is copied to a second location on the hard disk before a write is allowed to modify the data in the first location, and when reads and writes are redirected. In addition, since space on the hard drive is required for the original data and the modified data, the hard disk capacity available to the user may be reduced to approximately 50% of the actual capacity of the hard disk.

BRIEF DESCRIPTION OF THE DRAWINGS

The features and advantages of the present invention will become apparent from the appended claims and the following detailed description of one or more example embodiments, in which:

DETAILED DESCRIPTION

The present disclosure describes one or more example embodiments of methods and apparatuses which support incremental provisioning of software. Such methods and apparatuses may be used to provision or reprovision a data processing system, or a multitude of data processing systems, more quickly than is possible using conventional means.

Figure 1:
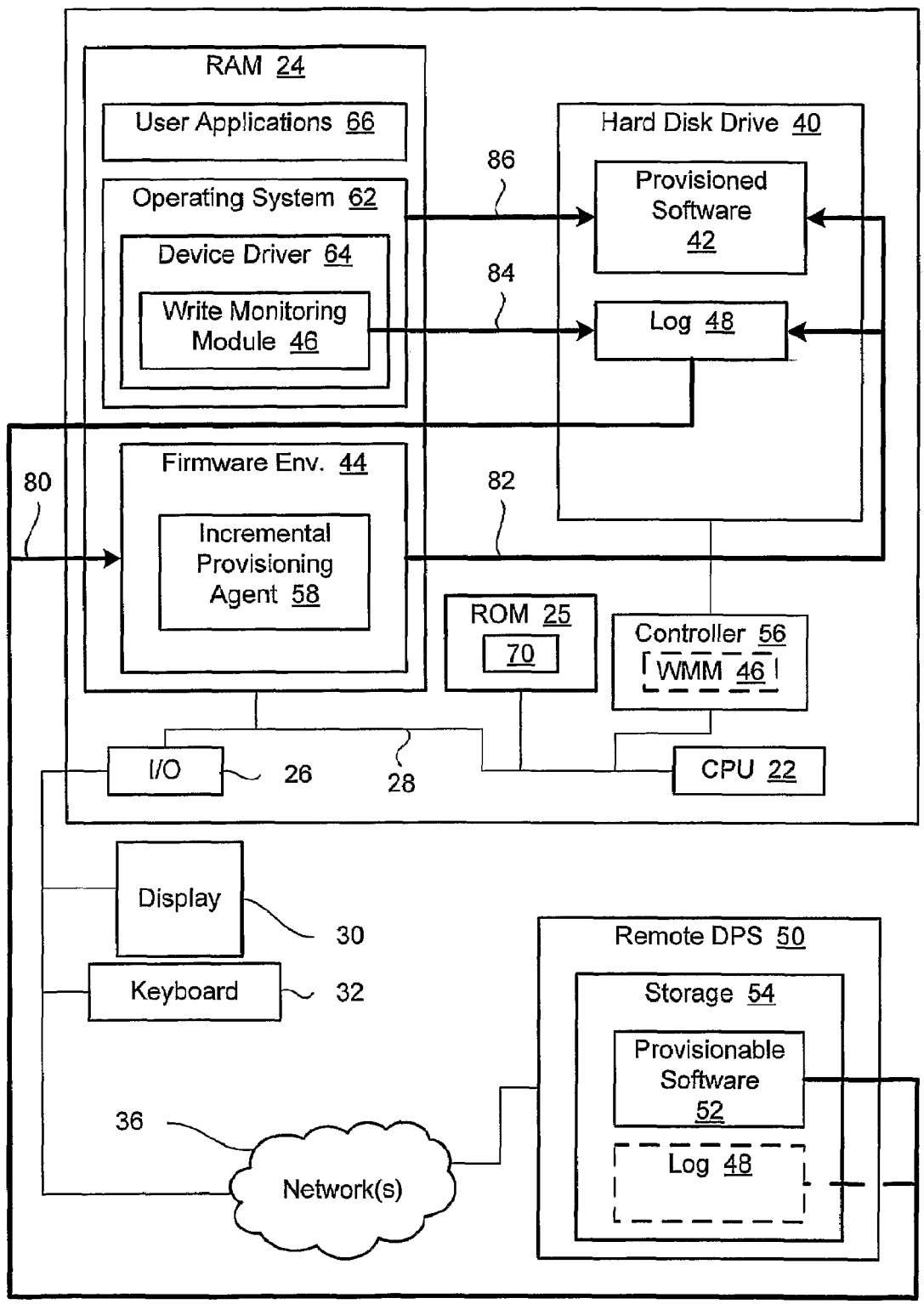
FIG. 1 is a block diagram depicting an example embodiment of a suitable data processing environment in which certain aspects of the invention may be implemented.

FIG. 1 and the following discussion are intended to provide a general description of a suitable environment in which certain aspects of the present invention may be implemented. As used herein, the terms "processing system" and "data processing system" are intended to broadly encompass a single machine, or a system of communicatively coupled machines or devices operating together. Exemplary processing systems include, without limitation, distributed computing systems, supercomputers, computing clusters, mainframe computers, mini-computers, client-server systems, personal computers, workstations, servers, portable computers, laptop computers, tablet processing systems, telephones, personal digital assistants (PDAs), handheld devices, entertainment devices such as audio and/or video devices, and other devices for processing or transmitting information.

The data processing environment of FIG. 1, for example, may include a processing system 20 that includes one or more processors or central processing units (CPUs) 22 communicatively coupled to various other components via one or more buses 28 or other communication conduits or pathways. Such components may include one or more volatile or non-volatile data storage devices, such as random access memory (RAM) 24 and read-only memory (ROM) 25. For purposes of this disclosure, the term "ROM" may be used in general to refer to non-volatile memory devices such as erasable programmable ROM (EPROM), electrically erasable programmable ROM (EEPROM), flash ROM, flash memory, etc. CPU 22 may also be communicatively coupled to mass storage devices, such as one or more integrated drive electronics (IDE), small computer systems interface (SCSI), or other types of hard disk drives 40. Other types of mass storage devices and storage media that may be used by processing system 20 may include floppy-disks, optical storage, tapes, flash memory, memory sticks, digital video disks, biological storage, etc.

The components coupled to processor 22 may also include one or more PCI root bridges and one or more PCI-to-PCI bridges. One or more of the above bridges and buses may be used to connect processor 22, either directly or indirectly, with storage devices and with additional components, such as one or more input/output (I/O) devices, ports, or controllers 26. Such devices may include a video controller, a SCSI controller, a network controller, a universal serial bus (USB) controller, a keyboard controller, etc. In one embodiment, one or more devices may be implemented as embedded controllers, using components such as programmable or non-programmable logic devices or arrays, application-specific integrated circuits (ASICs), embedded computers, smart cards, and the like. For instance, a PCI root bridge may be implemented as an embedded device, residing on a system backplane or motherboard.

Processing system 20 may be controlled, at least in part, by input from conventional input devices, such as a keyboard 32, a mouse, etc., and/or by directives received from one or more remote data processing systems 50, interaction with a virtual reality (VR) environment, biometric feedback, or other input sources or signals. Processing system 20 may send output to components such as a display device 30, remote data processing system 50, etc. Communications with remote data processing system 50 may travel through any suitable communications medium. Processing systems may be interconnected by way of a physical and/or logical network 36, such as a local area network (LAN), a wide area network (WAN), an intranet, the Internet, etc. Communications involving network 36 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including instructions, functions, procedures, data structures, application programs, etc. which when accessed by a machine result in the machine performing tasks or defining abstract data types or low-level hardware contexts. The data may be referred to in general as software, and it may be stored in volatile and/or non-volatile data storage.

For example, ROM 25 may include firmware instructions 70 for establishing a firmware environment 44 when processing system 20 is booted. Alternatively, some or all of the firmware instructions may be retrieved from one or more remote sources, such as remote data processing system 50.

A model for an interface between platform firmware and higher-level software such as operating systems was recently announced. That model is known as the Extensible Firmware Interface (EFI). Version 1.10 of the EFI Specification, dated Dec. 1, 2002, may be obtained from www.intel.com/technology/efi/main_specification.htm. The EFI specification defines a set of standard interfaces and structures to be provided by low-level platform firmware, for use in loading additional firmware and booting the OS. Platform frameworks based on the EFI model, such as the Intel® Platform Innovation Framework for EFI, are expected, within the next few years, to supplant frameworks based on the basic input/output system (BIOS) model as the frameworks of choice for designing, building, and operating data processing systems. The Intel® Platform Innovation Framework for EFI includes low-level firmware which provides boot and runtime service calls that are available to the operating system and its loader. In one embodiment of the present invention, firmware instructions 70 operate in accordance with the EFI specification.

Firmware instructions 70 may include numerous modules that are loaded into RAM 24 during the boot process before an OS 62 is launched. Those firmware modules may include a provisioning module or agent 58. Provisioning agent 58 may also be referred to as incremental provisional agent 58. Processing system 20 may also include a write monitoring module 46. In one embodiment, write monitoring module 46 is implemented as part of OS 62, for instance as part of a device driver 64 for managing reads from and writes to devices such as hard disk drive 40. In alternative embodiments, write monitoring module 46 may be implemented as software outside of OS 62, or as hardware or a combination of hardware and software, for instance as part of a disk drive controller 56 associated with hard disk drive 40, as suggested by the dashed box near the center of FIG. 1. Additional details concerning provisioning agent 58 and write monitoring module 46 are provided below.

Figure 2:
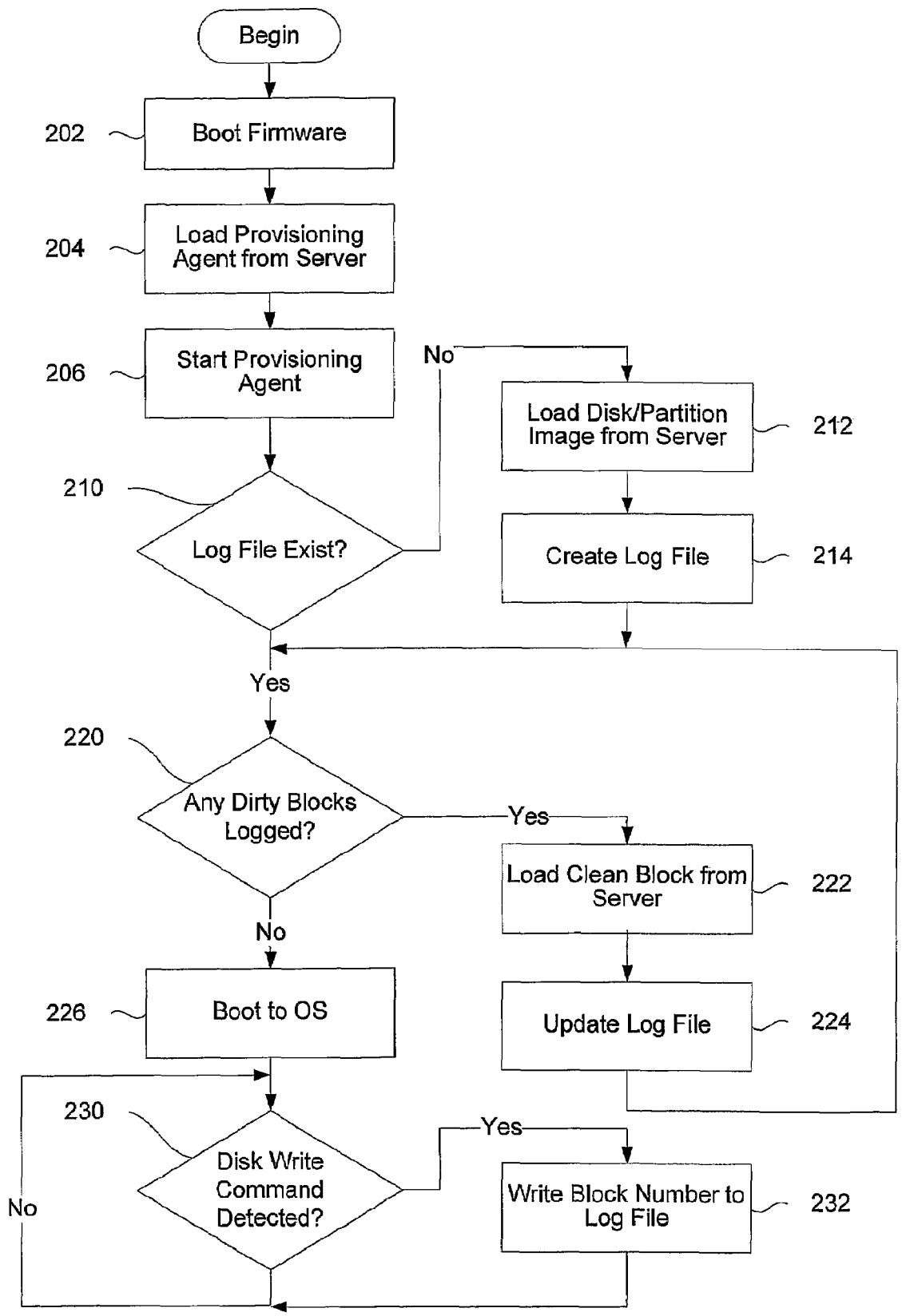
FIG. 2 is a flowchart illustrating a process for implementing incremental provisioning, in accordance with an example embodiment of the present invention.

FIG. 2 is a flowchart illustrating a process for implementing incremental provisioning, in accordance with an example embodiment of the present invention. The illustrated process may begin with processing system 20 beginning a boot process after having been powered on or reset, for example. The initial stages of the boot process may include loading and executing firmware instructions 70 to establish a preboot execution environment (PXE), as depicted at block 202. As indicated at block 204, processing system may then load a provisioning agent 58 into RAM 24. In one embodiment, processing system 20 obtains provisioning agent 58 from remote data processing system 50. Provisioning agent 58 may be designed to operate in the preboot execution environment. Additional components, such as a transmission control protocol (TCP) driver, may also be obtained from a local or remote source. Processing system 20 may then launch or start provisioning agent 58, as indicated at block 206.

As indicated at block 210, provisioning agent 58 may then determine whether a disk write log file 48 for processing system 20 exists. Disk write log file 48 may also be referred to as write log 48 or log file 48. As described in greater detail below, write log 48, if it exists, may include information that identifies which blocks within hard disk drive 40 have been modified. However, if write log 48 does not exist, provisioning agent 58 may conclude that processing system 20 has not yet been configured to support incremental provisioning, and provisioning agent 58 may therefore perform the initial provisioning of processing system 20. For instance, provisioning agent 58 may obtain a disk image from remote processing system 50, and provisioning agent 58 may load that image into hard disk drive 40 in processing system 20, as depicted at block 212.

For purposes of this disclosure, the term "disk image" refers a data image that contains or provides an exact, byte-for-byte copy of data on the subject drive (i.e., the drive from which the image was derived). Disk images may be created, for example, using tools such as the disk imaging utility distributed by Symantec Corporation under the trademark NORTON GHOST. A disk image may provide or constitute a copy of an entire physical hard disk drive, a copy of a logical drive, or a copy of a drive partition, for example.

As illustrated in FIG. 1, in the example embodiment, remote processing system 50 may include one or more storage devices 54 that contain a copy of a disk image to be used for provisioning platforms such as processing system 20. Such an image may be referred to in general as provisionable software 52.

Processing system 50 may be considered one possible embodiment of a remote management device or remote management system. Since the content of provisionable software 52 typically will not be affected by operations at processing system 20, provisionable software 52 may also be considered a backup or archive copy of the initial software content of processing system 20. Once provisionable software 52 has been copied into processing system 20, the copy in hard disk drive 40 may be referred to a provisioned software 42. Accordingly, processing system 20 may also be referred to as target processing system 20, managed processing system 20, or local processing system 20. Provisioned software 42 may include, for example, OS 62, one or more user applications 66 (e.g., a web browser program, a word processing application, etc.), information pertaining to configuration settings for the software and/or hardware in processing system 20, and other data.

Referring again to FIG. 2, in conjunction with provisioning processing system with the original disk image, provisioning agent 58 may create write log 48, as indicated at block 214. In one embodiment, write log 48 resides in processing system 20. Write log 48 may reside in hard disk drive 40 or in other non-volatile storage such as EEPROM or flash memory. In alternative embodiments, write log 48 may reside outside of processing system 20, for example in remote processing system 50, as indicated by the dashed box toward the bottom of FIG. 1.

As depicted at block 220 in FIG. 2, after creating write log 48 or determining that write log 48 already exists, provisioning agent 58 may determine whether write log 48 identifies any blocks from hard disk drive 40 as having been modified since the last time processing system 20 was provisioned. Blocks that are identified as having been modified may also be referred to as dirty blocks. If write log 48 does not identify any dirty blocks, provisioning agent 58 may conclude that provisioned software 42 matches provisionable software 52, and may therefore allow processing system 20 to boot OS 62, as indicated at block 226. In the example embodiment, the OS 62 is part of provisioned software 42.

However, if write log 48 includes one or more entries identifying one or more dirty blocks, provisioning agent 58 obtains a clean copy of one of those blocks from provisionable software 52 in remote processing system 50, and overwrites the dirty block in hard disk drive 40 with the clean block, as indicated at block 222. At block 224 provisioning agent 58 may then update write log 48 so that write log 48 no longer identifies the block in question as dirty. As indicated by the arrow returning to block 220 from block 224, provisioning agent 58 may continue to obtain clean blocks from remote processing system 50 and copy those blocks over the dirty blocks in hard disk drive 40 until the original content has been returned to each dirty block.

In one embodiment, provisioning agent 58 utilizes native provisioning infrastructure in an EFI-compliant firmware environment to facilitate the original provisioning operations and the subsequent incremental provisioning operations. Other resources may be used to provision and/or incrementally reprovision managed processing systems in alternative embodiments.

Once provisioned software 42 has been restored to its original condition or determined to be clean, provisioning agent 58 may allow processing system 20 to boot OS 62, as indicated at block 226. Once processing system 20 boots to OS 62, write monitoring module 46 may begin monitoring all write commands addressed to hard disk drive 40. As indicated at blocks 230 and 232, whenever write monitoring module 46 detects a write command addressed to hard disk drive 40, write monitoring module 46 makes sure that write log 48 includes an entry to identify to block being modified or written to.

For instance, write monitoring module 46 may maintain a bit map corresponding to the blocks in hard disk drive 40, with write monitoring module 46 setting bits as appropriate to indicate whether respective blocks have been logged as dirty. Accordingly, write monitoring module 46 may update write log 48 only when the block being addresses has not already been flagged as dirty in the bitmap. To improve performance, the bitmap may reside in RAM 24. In order not to miss any modifications, the logging operation may be completed before the write operation is executed and/or before the bitmap is updated. To minimize the amount of time required to complete the logging operation, the log may be stored in a faster storage medium, such as in registers on some dedicated hardware device. Alternatively, for write logs kept in remote processing systems, high-speed reliable connections to the remote systems may be used to transmit log updates.

Referring again to FIG. 1, arrows 80 and 82 illustrate that provisioning agent 58 may retrieve, from remote processing system 50, the necessary data to load and restore provisioned software 42 in processing system 20. The provisioning and reprovisioning operations may therefore be managed completely or primarily from within firmware environment 44. Further, the provisioning and reprovisioning operations may be completely automated, with those operations being managed with regard to a local or remote write log 48. Arrows 84 and 86 illustrate that write monitoring module 46 may update write log 48 to identify the blocks in hard disk drive 40 being modified by OS 62.

Figure 3:
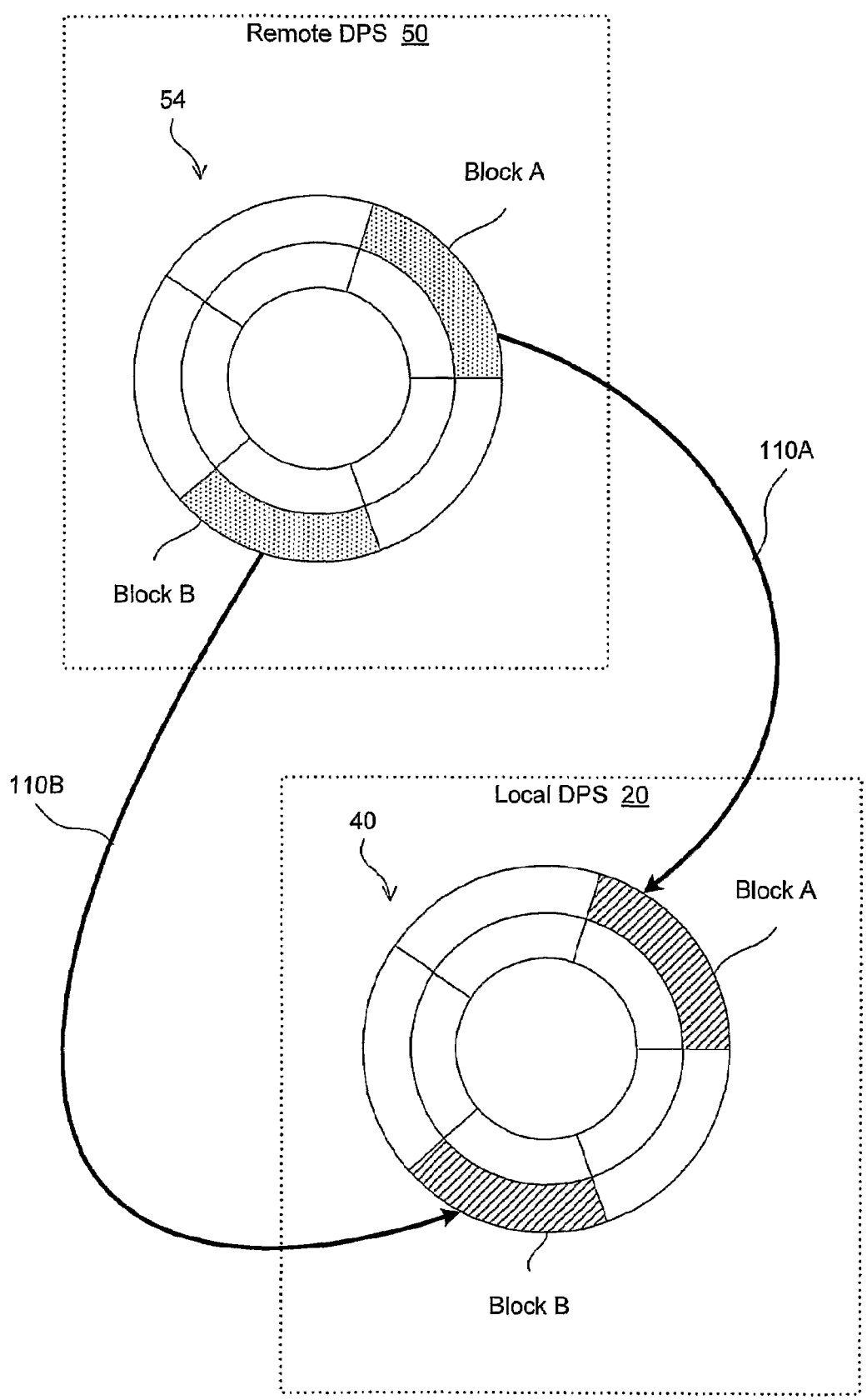
FIG. 3 is a block diagram depicting incremental provisioning operations performed according to an example embodiment of the present invention.

FIG. 3 is a block diagram depicting incremental provisioning operations performed according to an example embodiment of the present invention. For purposes of illustration, FIG. 3 depicts ten individual blocks within hard disk drive 40, and ten corresponding blocks in the model image 52 in remote processing system 50. In processing system 20 the slanted lines within blocks A and B indicate that those two blocks are identified as dirty in write log 48. In remote processing system 50 the dots in the corresponding blocks A and B indicate that those blocks contain a backup copy of the content that was originally provisioned into blocks A and B of target processing system 20. Arrows 110A and 110B indicate that, when provisioning agent 58 runs in processing system 20, provisioning agent 58 will replace the modified content of dirty blocks A and B with clean content from storage device 54 in remote processing system 50.

Also, in FIG. 3, the blocks in hard disk drive 40 that are not filled with slanted lines represent blocks that were provisioned and are still clean. Consequently, in the illustrated embodiment, provisioning agent 58 overwrites only blocks A and B in hard disk drive 40. Processing system 20 may therefore be reprovisioned in a fraction of the time that would be required to provision an entire disk image. When implemented in an EFI-compliant platform, the invention may provide EFI-based incremental provisioning in a networked environment. For instance, the invention may provide incremental data collection and restoration.

In the example embodiment, OS 62 addresses hard disk drive 40 by reference to blocks or block addresses. For instance, each block in hard disk drive 40 may be identified by a unique logical block address (LBA). OS 62 may use those LBAs in write commands directed to hard disk drive 40, and write monitoring module 46 may use those LBAs, or values based on those LBAs, to identify dirty blocks in write log 48. In alternative embodiments, the mass storage device holding the software configuration in the managed processing system may use different types of storage subdivisions, an operating system in the managed processing system may address the storage device by reference to other types of addresses or indexes, and the write monitoring module may use other types of indexes or addresses to keep track of which blocks or subdivisions have been modified.

In an example embodiment, the platform firmware does not require a file system driver. In addition, the teachings herein could be used to manage storage devices that employ any suitable file system, including without limitation, file allocation table (FAT) file systems, NT file systems (NTFSs), and future file systems. Such file systems may be supported without requiring a file system driver in the platform firmware. The teachings may also be implemented without requiring any additional hardware components in the managed processing systems.

The teachings of the present disclosure may be used to advantage in any environment that includes a processing system to be restored to an original software configuration. For instance, a private or public entity or organization may wish to deploy numerous processing systems for utilization by individual users. Those processing systems may all have identical or substantially similar hardware configurations, and the above process may be used to provide each of those systems with the same software configuration from a central server or a group of servers.

After the initial software configuration is loaded, multiple users may utilize the managed processing systems. For instance, a first user may use one of the systems, and then a second user may use that same system. For purposes of this document, the period of time spent by a user interacting with a processing system may be referred to as a user session or a session of interaction. A user session may be terminated by resetting or rebooting the processing system, or by any other suitable event. In case any changes may have been made to the software configuration when the first user was interacting with the system, the system may be rebooted after the first user has finished his or her session of interaction and before the second user starts his or her session. In accordance with the teachings herein, during the reboot process the original content may be automatically restored to any modified storage blocks in the system. For instance, the modified blocks may be restored after the OS terminates for one user session but before the OS is launched again for the next user session. The desired software configuration may thus be rapidly restored to the system in preparation for the next session of interaction with a user.

For example, if an organization wished to equip a number of Internet cafes with processing systems to be used by the general public, the teachings herein could be used to rapidly restore each processing system to an original software configuration by simply rebooting each processing system between each user session. According to one embodiment, through use of incremental provisioning, it may be possible to restore a disk image within two minutes or less after one user checks out and before the next user checks in. A similar usage model may be used in the education sector and in other public and private organizations.

In light of the principles and example embodiments described and illustrated herein, it will be recognized that the illustrated embodiments can be modified in arrangement and detail without departing from such principles. For instance, although one or more example embodiments have been described, for purposes of illustration, with regard to software to be incrementally provisioned to a hard disk drive, alternative embodiments include embodiments in which software, configuration data, or other information associated with establishing a particular environment on a target platform is incrementally provisioned into any suitable type of mass storage device.

Also, an alternative embodiment may involve replacing the model disk image in the management server with a new model imaging that incorporates changes such as updates to software or configuration settings. The management server may then push the new model image, or the modified portions of that image, to the managed clients. The clients may then utilize incremental re-provisioning to maintain the updated image using a process such as the one described above with regard to FIG. 2, in which the clients initiate the transmission of the backup data.

Although the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, it will be apparent to those of ordinary skill in the art that numerous modifications to the processes could be applied to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method comprising:
    copying a disk image to a hard disk drive on a managed platform, wherein the disk image is copied from a model disk image stored on a storage device of a remote management system;
    during a user session on the managed platform, monitoring write commands from an operating system of the managed platform;
    in response to detecting write commands from the operating system that address blocks of the hard disk drive, automatically updating a write log to identify the blocks addressed by the write commands;
    after completion of the user session, automatically determining whether one or more blocks of the hard disk drive were modified, based at least in part on the write log; and
    in response to determining that at least one block in the hard disk drive was modified, automatically restoring original contents to the modified block during a boot process for the managed platform by overwriting the modified block with corresponding backup data from the model disk image.

2. A method according to claim 1, wherein the operation of copying a disk image to a hard disk drive on a managed platform comprises:
    provisioning the managed platform with software by automatically loading the disk image into the managed platform from the remote management system during a boot process for the managed platform.

3. A method according to claim 1, wherein the disk image comprises an image of a disk partition.

4. A method according to claim 1, further comprising:
    terminating the operating system on the managed platform before restoring the original contents to the modified block from the remote management system.

5. A method according to claim 4, further comprising:
    launching the operating system on the managed platform after restoring the original contents to the modified block from the model disk image.

6. A method comprising:
    during a user session on a platform, in response to write commands addressing blocks of a storage device in the platform, automatically updating a write log to identify the blocks addressed by the write commands;
    after completion of the user session, automatically identifying one or more modified blocks in the storage device, based at least in part on the write log; and
    in response to identifying at least one modified block in the storage device, automatically replacing data in the modified block with backup data from a different storage device.

7. A method according to claim 6, further comprising:
    in advance of the user session, provisioning the platform with software by copying a disk image to the storage device in the platform from a model disk image stored on the different storage device.

8. A method according to claim 7, wherein the operation of copying a disk image comprises copying the disk image from a remote data processing system.

9. A method according to claim 6, wherein the storage device in the platform comprises a hard disk drive.

10. A method according to claim 6, wherein the operation of automatically replacing data in the modified block with backup data from a different storage device comprises:
    automatically restoring the modified block during a boot process for the platform by overwriting the modified block with corresponding backup data from a model disk image.

11. A method according to claim 6, further comprising:
    terminating an operating system on the platform before replacing the data in the modified block with backup data from the different storage device.

12. A method according to claim 11, further comprising:
    launching the operating system on the platform after replacing the data in the modified block with backup data from the different storage device.

13. An apparatus comprising:
    a machine accessible storage medium; and
    instructions encoded in the machine accessible storage medium, wherein the instructions, when executed by a processing system, perform operations comprising:
    during a user session on the processing system, in response to write commands addressing blocks of a storage device in the processing system, automatically updating a write log to identify the blocks addressed by the write commands;
    after completion of the user session, automatically identifying one or more modified blocks in the storage device, based at least in part on the write log; and
    in response to identifying at least one modified block in the storage device, automatically replacing data in the modified block with backup data from a different storage device.

14. An apparatus according to claim 13, wherein the instructions comprise firmware instructions to execute before the processing system boots to an operating system.

15. An apparatus according to claim 13, wherein the instructions perform further operations comprising:
    in advance of the user session, provisioning the processing system with software by copying a disk image to the storage device in the processing system from a model disk image stored on the different storage device.

16. An apparatus according to claim 15, wherein the instructions cause the processing system to copy the disk image from a remote data processing system.

17. An apparatus according to claim 13, wherein the storage device in the processing system comprises a hard disk drive.

18. An apparatus according to claim 13, wherein the operation of automatically replacing data in the modified block with backup data from a different storage device comprises:

automatically restoring the modified block during a boot process for the processing system by overwriting the modified block with corresponding backup data from a model disk image.

19. An apparatus according to claim 13, wherein the instructions perform further operations comprising:
terminating an operating system on the processing system before replacing the data in the modified block with backup data from the different storage device.

20. An apparatus according to claim 19, wherein the instructions perform further operations comprising:
launching the operating system on the platform after replacing the data in the modified block with backup data from the different storage device.

21. A processing system comprising:
a machine accessible storage medium;
a storage device;
a processor;
one or more communication paths to couple the processor with the machine accessible storage medium and the storage device; and
instructions encoded in the machine accessible storage medium, wherein the instructions, when executed by the processor, perform operations comprising:
during a user session on the processing system, in response to write commands addressing blocks of the storage device, automatically updating a write log to identify the blocks addressed by the write commands;
after completion of the user session, automatically identifying one or more modified blocks in the storage device, based at least in part on the write log; and
in response to identifying at least one modified block in the storage device, automatically replacing data in the modified block with backup data from a different storage device.

22. A processing system according to claim 21, wherein the instructions comprise firmware instructions to execute before the processing system boots to an operating system.

23. A processing system according to claim 21, wherein the instructions perform further operations comprising:
in advance of the user session, provisioning the processing system with software by copying a disk image to the storage device in the processing system from a model disk image stored on the different storage device.

24. A processing system according to claim 23, wherein the instructions cause the processing system to copy the disk image from a remote data processing system.

25. A processing system according to claim 24, further comprising the remote data processing system.

26. A processing system according to claim 21, wherein the storage device in the processing system comprises a hard disk drive.

27. A processing system according to claim 21, wherein the operation of automatically replacing data in the modified block with backup data from a different storage device comprises:
automatically restoring the modified block during a boot process for the processing system by overwriting the modified block with corresponding backup data from a model disk image.

28. A processing system according to claim 21, wherein the instructions perform further operations comprising:
terminating an operating system on the processing system before replacing the data in the modified block with backup data from the different storage device.

29. A processing system according to claim 28, wherein the instructions perform further operations comprising:
launching the operating system on the platform after replacing the data in the modified block with backup data from the different storage device.

* * * * *